United States Patent
Alsudairawi

(10) Patent No.: US 9,267,462 B1
(45) Date of Patent: Feb. 23, 2016

(54) FLUID EXPANSION ENGINE

(71) Applicant: KUWAIT INSTITUTE FOR SCIENTIFIC RESEARCH, Safat (KW)

(72) Inventor: Mane Alsudairawi, Qurtoba (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 14/863,395

(22) Filed: Sep. 23, 2015

Related U.S. Application Data

(63) Continuation-in-part of application No. 14/667,633, filed on Mar. 24, 2015.

(51) Int. Cl.
| | | |
|---|---|---|
| F03C 1/00 | (2006.01) | |
| F01K 25/02 | (2006.01) | |
| F02G 1/044 | (2006.01) | |
| F03G 7/06 | (2006.01) | |
| F01K 25/12 | (2006.01) | |

(52) U.S. Cl.
CPC ............. *F02G 1/044* (2013.01); *F01K 25/02* (2013.01); *F01K 25/12* (2013.01); *F03G 7/06* (2013.01)

(58) Field of Classification Search
CPC ......... F02G 1/044; F01K 25/12; F01K 25/02; F03G 7/06
USPC ............................................ 60/530, 650, 682
See application file for complete search history.

(56) References Cited

U.S. PATENT DOCUMENTS

| | | | |
|---|---|---|---|
| 1,717,161 A | 6/1929 | Malone | |
| 4,257,231 A | 3/1981 | Banks | |
| 4,511,805 A | 4/1985 | Boy-Marcotte et al. | |
| 5,579,640 A * | 12/1996 | Gray, Jr. ................ | B60K 6/12 60/413 |
| 5,916,140 A | 6/1999 | Hageman | |
| 2006/0059912 A1 * | 3/2006 | Romanelli ............ | F01K 27/005 60/645 |
| 2011/0061836 A1 | 3/2011 | Ingersoll et al. | |
| 2012/0159942 A1 * | 6/2012 | Klassen ............... | F02G 1/0435 60/522 |
| 2013/0061590 A1 | 3/2013 | Iockheck | |
| 2013/0152578 A1 * | 6/2013 | Solem .................... | F01K 25/02 60/530 |

OTHER PUBLICATIONS

Greg Swift, Los Alamos National Laboratory, Los Alamos NM, "John Malone and Liquid Thermodynamics" retrieved from the Internet on Sep. 29, 2014.

* cited by examiner

*Primary Examiner* — Hoang Nguyen
(74) *Attorney, Agent, or Firm* — Richard C. Litman

(57) ABSTRACT

The fluid expansion engine uses a liquid working fluid contained by primary pressurized cylinders. A heat exchange system alternately cycles hot and cold through the primary pressurized cylinders. As a result, the liquid working fluid in the cylinders reciprocally expands and contracts. The work done by the fluid expansion engine is extracted via a hydraulic pump and gearbox connected to secondary pressurized cylinders attached to the primary pressurized cylinders.

6 Claims, 4 Drawing Sheets

FLUID EXPANSION ENGINE

CROSS-REFERENCE TO RELATED APPLICATION

This application is a continuation-in-part of U.S. patent application Ser. No. 14/667,633, filed Mar. 24, 2015.

BACKGROUND OF THE INVENTION

1. Field of the Invention

The present invention relates to heat engines, and particularly to a fluid expansion engine that converts heat-driven expansion of a liquid without phase change into mechanical or electrical power.

2. Description of the Related Art

Energy in general and electrical energy in particular are essential for human activities. This energy can be expensive due to the cost of needed fuel and the complexity of required conversion systems. In addition most power-generating systems can have adverse effect on the environment. Providing simple and cost effective methods for energy production can improve the quality of life for less fortunate people. Alternative energy production methods may also improve environmental quality, which currently is under great constraint due to high energy demand.

Thus, a fluid expansion engine solving the aforementioned problems is desired.

SUMMARY OF THE INVENTION

The fluid expansion engine uses a liquid working fluid contained by primary pressurized cylinders. A heat exchange system alternately cycles hot and cold heat exchanger medium through heat exchanger coils in the primary pressurized cylinders so that the cylinders have opposite temperatures, i.e., when one is hot, the other is cold. As a result, the liquid working fluid in the cylinders reciprocally expands and contracts. The work done by this fluid expansion engine is extracted via exchange of working fluid flow between the cylinders through a fluid motor and gearbox connected to secondary pressurized cylinders attached to the primary pressurized cylinders.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fluid expansion engine uses a liquid working fluid contained by at least one pressurized cylinder. An electric pump drives a heat exchange system in order to provide in the working fluid a four stage fluid expansion engine (FEE) PV cycle.

Figure 3:
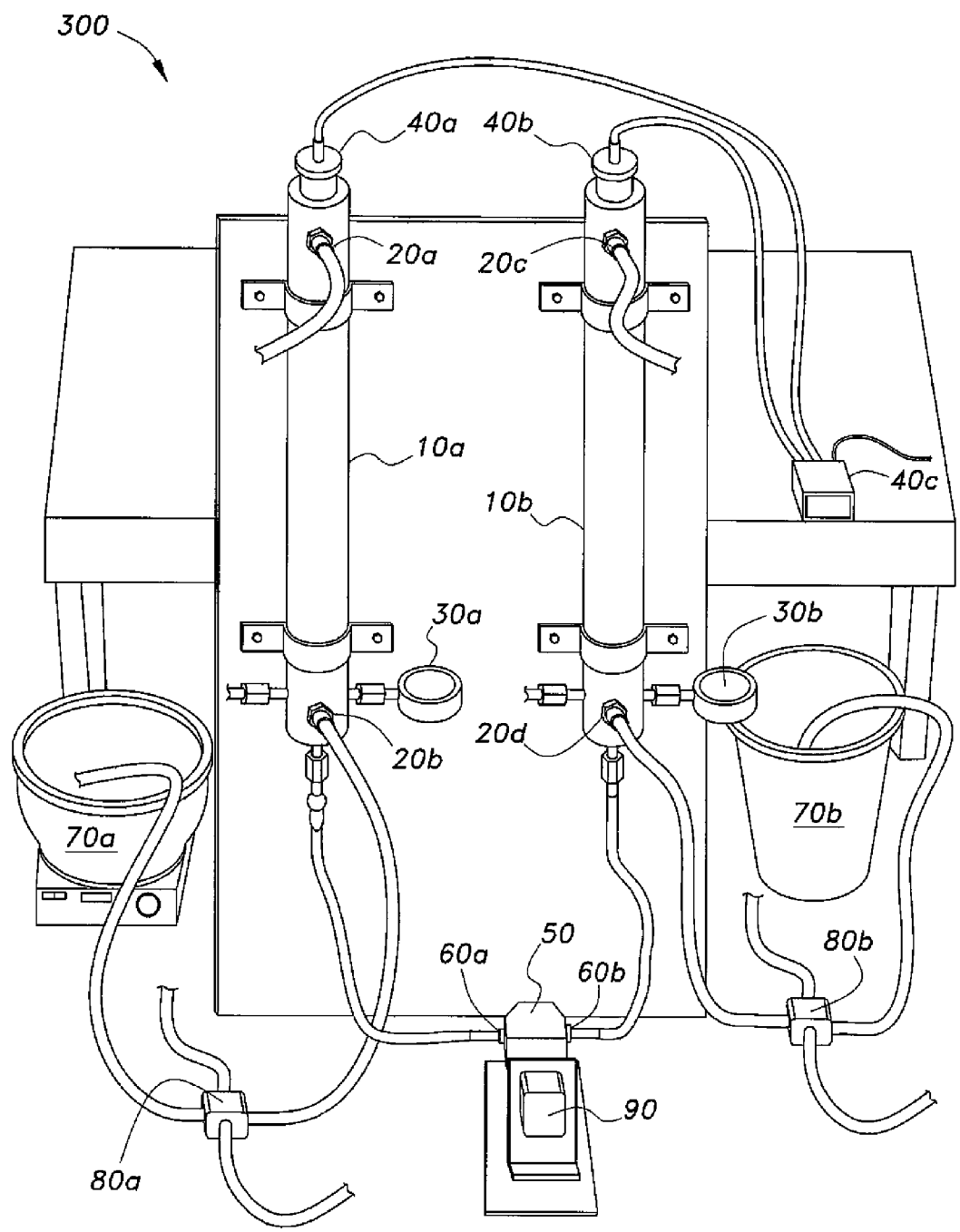
FIG. 3 is a perspective view of a Fluid Expansion Engine according to the present invention.
Figure 4:
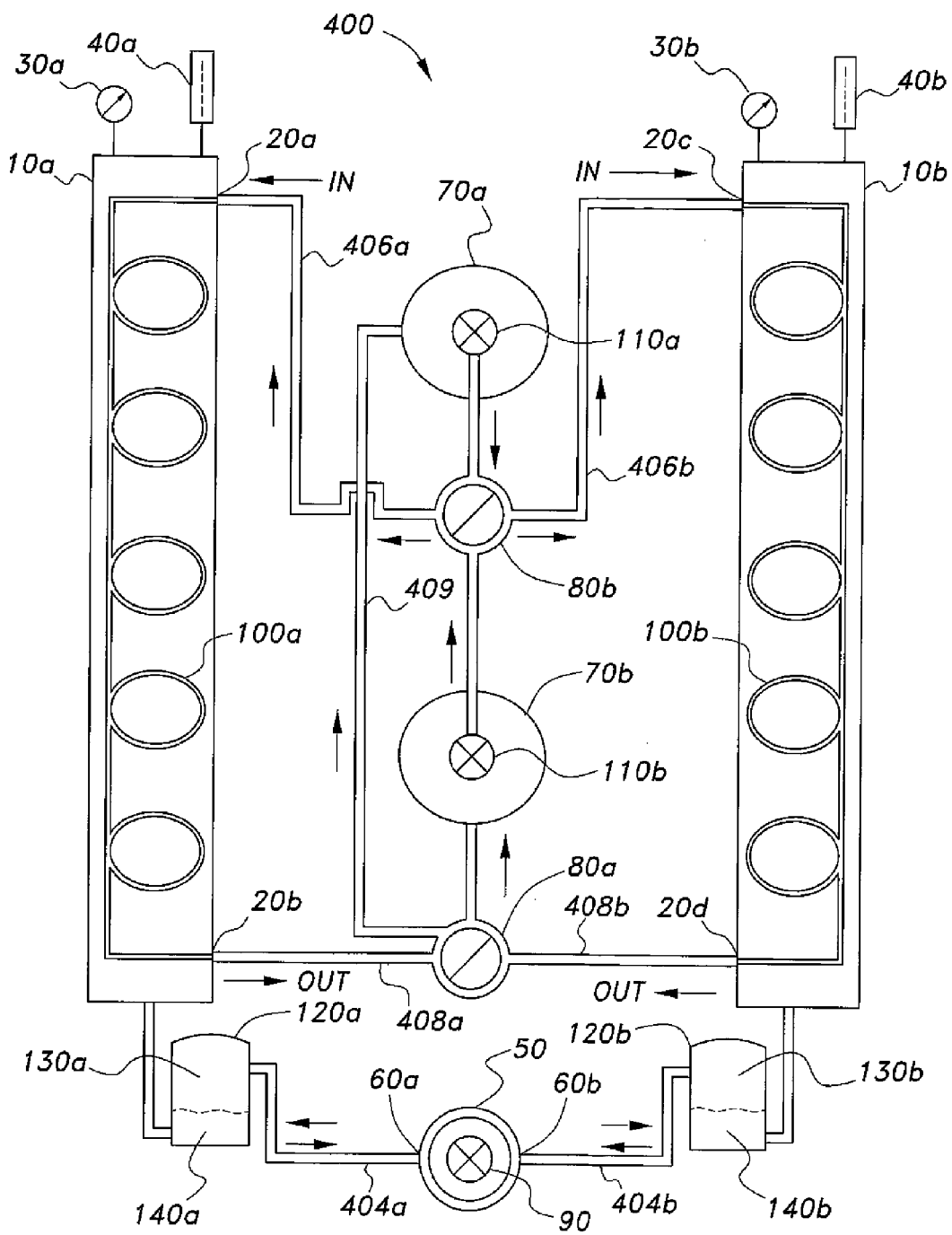
FIG. 4 is a schematic diagram of a Fluid Expansion Engine according to the present invention.

As shown in the schematic diagram of FIG. 4, the fluid expansion engine 400 includes primary pressurized vessels 10a and 10b, which can be the exemplary cylinders 10a, 10b shown in FIG. 3. Each primary pressurized vessel 10a, 10b has a respective heat exchanger inlet 20a and 20c at one end of the primary pressurized vessel 10a, 10b. Heat exchanger outlets 20b and 20d are disposed on the opposing end of cylinders 10a and 10b, respectively. A heat exchanger 100a (a tubular copper coil) for the primary pressurized vessel 10a is connected between the heat exchanger inlet 20a and the heat exchanger outlet 20b. This first heat exchanger 100a will cyclically heat and cool the liquid contained by the primary pressurized vessel 10a. A second heat exchanger 100b (also a tubular copper coil) for the primary pressurized vessel 10b is connected between the heat exchanger inlet 20c and the heat exchanger outlet 20d. This second heat exchanger 100b will cyclically heat and cool the liquid contained by primary pressurized vessel 10b. The cyclic heating and cooling of the liquid in primary pressurized vessels 10a and 10b is reciprocal (i.e., when the liquid in vessel 10a is heated, the liquid in vessel 10b is cooled, and vice versa), the liquid never changing phase during the cycle.

Measurements of temperature and pressure may be taken at the primary pressurized vessels 10a, 10b. For example a pressure gauge 30a may be disposed at the heat exchanger inlet end of primary pressurized vessel 10a to measure pressure inside the vessel 10a. A thermometer 40a may be disposed at the heat exchanger end of the cylinder 10a to measure the temperature of the working fluid (e.g., glycerin or mercury) in the cylinder 10a. Similarly, pressure gauge 30b may be disposed at the heat exchanger inlet end of the primary pressurized vessel 10b to measure pressure inside the vessel 10b. A thermometer 40b may be disposed at the heat exchanger end of the cylinder 10b to measure the temperature of the working fluid (e.g., glycerin) in the cylinder 10b. Alternatively, as shown in FIG. 3, in the experimental configuration 300, the pressure gauges 30a and 30b may be disposed at outlet end of pressurized vessels 10a and 10b, respectively.

The bottom portion of the primary vessel 10a has a conduit that leads to secondary pressurized vessel 120a. Similarly, the bottom portion of the primary vessel 10b has a conduit that leads to another secondary pressurized vessel 120b. The working fluid 140a fills a bottom portion of the secondary pressurized vessel 120a, the remaining portion of the secondary pressurized vessel 120a being filled by hydraulic fluid 130a. Similarly, the working fluid 140b fills a bottom portion of the secondary pressurized vessel 120b, the remaining portion of the secondary pressurized vessel 120b being filled by hydraulic fluid 130b. A conduit 404a extending from the upper portion of the secondary pressurized vessel 120a is connected to an inlet 60a of a fluid motor 50. A conduit 404b extending from upper portion of the secondary pressurized vessel 120b is connected to another outlet 60b of the fluid motor 50. The fluid motor 50 is connected to a gearbox 90 to extract work done by the FEE 400, wherein alternate cyclic expansion/contraction of the working fluid contained by the liquid-containing primary pressurized vessels 10a and 10b causes the working fluid to flow in alternate directions in the lower chambers of the secondary pressurized vessels 120a, 120b, inducing the hydraulic fluid in the upper chambers to flow through the hydraulic pump first in one direction, then in the opposite direction, fluid motor 50 bring coupled to the gearbox 90 to convert rotation of the fluid motor's shaft to useful work. It will be understood that the gearbox 90 may convert the alternate clockwise and counterclockwise rotation of the fluid motor's shaft into unidirectional rotation, either to perform mechanical work or to rotate a generator shaft to generate electricity.

With respect to the heat exchange circuitry (also shown in the schematic diagram of FIG. 4), a heat exchange conduit 406a extends from the top heat exchange inlet 20a and is connected to a first port of a four-way valve 80b. Another heat exchange conduit 406b extends from a second port of the four-way valve 80b and connects to the top heat exchange inlet 20c of primary pressurized vessel 10b. An electric water pump 110a is disposed in a hot reservoir 70a. The output of the electric water pump 110a is connected via a conduit extending from the hot reservoir 70a to a third port of the four-way valve 80b. Another electric water pump 110b is disposed in a cold reservoir 70b. The output of the electric water pump 110b is connected via a conduit extending from the cold reservoir 70b to a fourth port of the four-way valve 80b.

A heat exchange conduit 408a extends from the bottom heat exchange outlet 20b and is connected to a first port of another four-way valve 80a. Heat exchange conduit 408b extends from a second port of the four way valve 80a and connects to bottom heat exchange outlet 20d of primary pressurized vessel 10b. The input of the electric water pump 110b is connected via a conduit extending from the cold reservoir 70b to a third port of the four-way valve 80a. Conduit 409 connects a fourth port of the four-way valve 80a to an inlet of the hot reservoir 70a.

Figure 1:
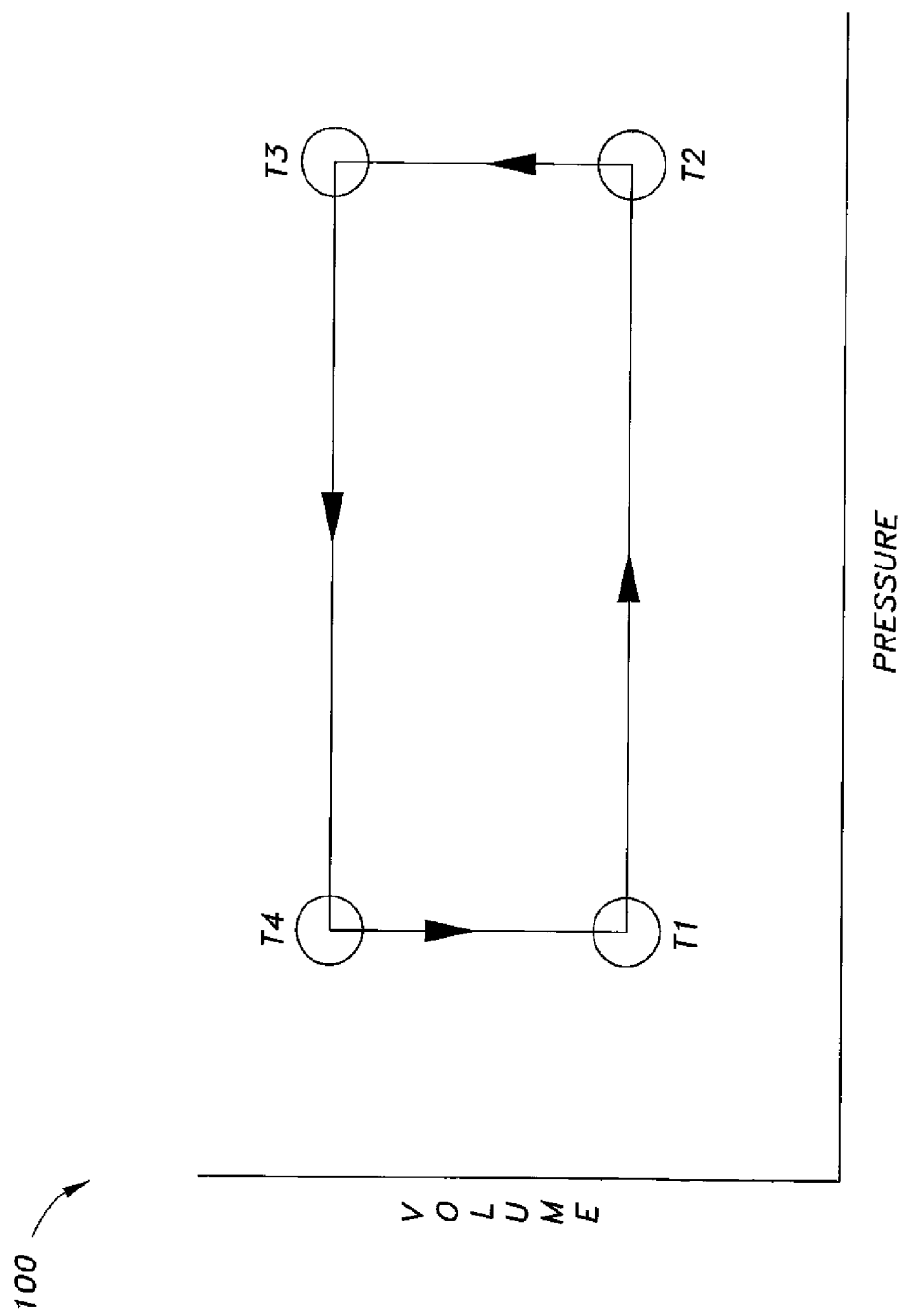
FIG. 1 is a PV (pressure-volume) diagram for a Fluid Expansion Engine (FEE) according to the present invention.

FIG. 1 illustrates the FEE cycle 100, which is governed by Equations (1) and (2) below:

$$\alpha_V = \frac{1}{V}\frac{dV}{dT}, \quad (1)$$

where V is the volume of the material, $$\frac{dV}{dT}$$

is the rate of change of that volume with temperature, and $\alpha_V$ is the volumetric thermal expansion coefficient (constant); and $$K = -V\frac{dP}{dV}, \quad (2)$$

where Equation (2) expresses the Bulk modulus, P is the pressure, V is the volume, dP/dV denotes the derivative of pressure with respect to volume, and K is a constant. From Equations (1) and (2), the change of pressure with respect to temperature T at constant volume can be derived as follows:

$$\Delta P = \alpha_V K \Delta T. \quad (3)$$

The heat capacity is defined by:

$$C = \frac{Q}{\Delta T}, \quad (4)$$

where Q is the amount of heat and ΔT is the change in temperature.

Figure 2:
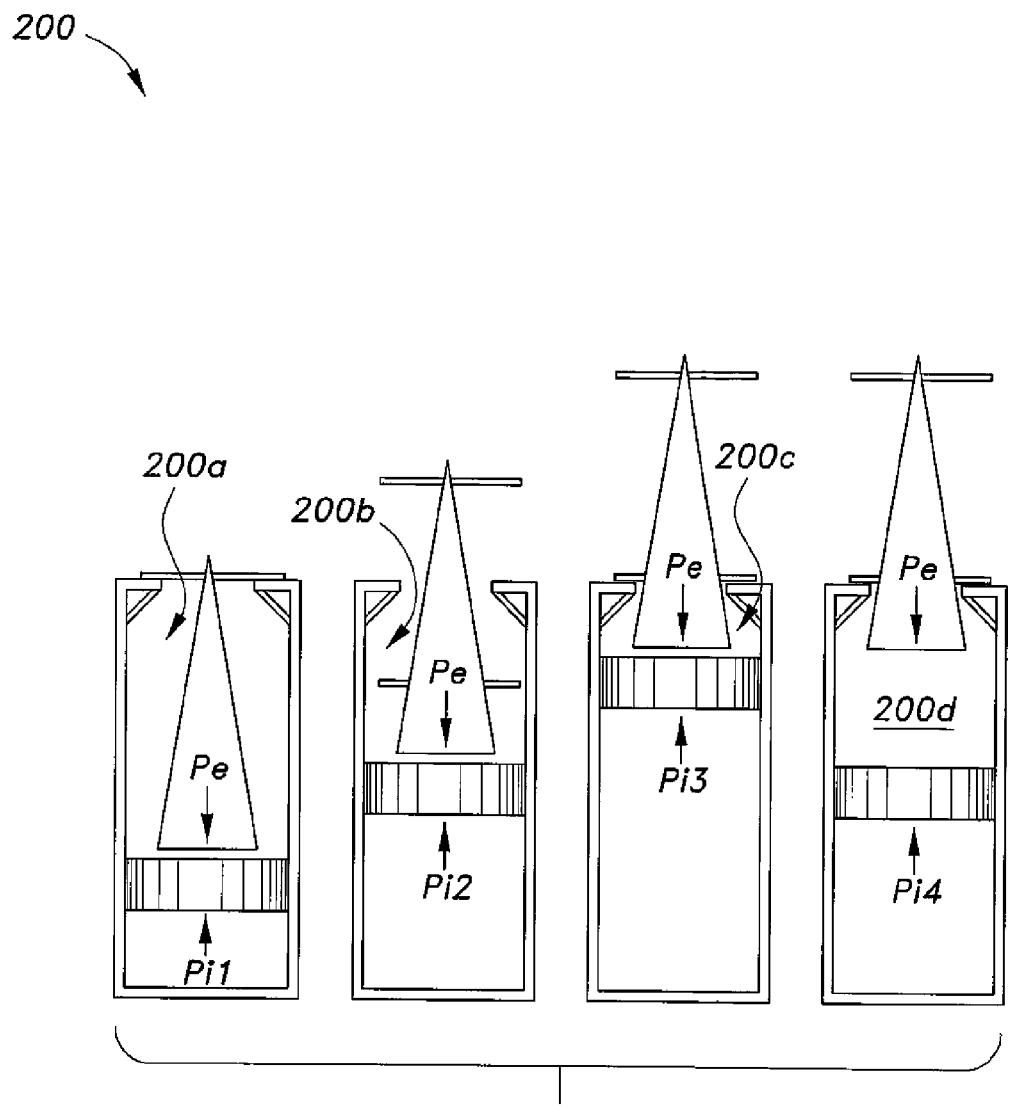
FIG. 2 is a schematic diagram showing work being done via liquid fluid displacement of a piston in a cycle of a FEE according to the present invention.

FIG. 2 presents four steps, 200a, 200b, 200c, and 200d representing the power cycle of a simple system that includes a cylinder 200 filled with a liquid fluid capped by a piston. The initial volume of V1. A weight is placed just above the piston, restricting the expansion of the fluid with a pressure Pe.

In step 200a, as the temperature increases from T1 to T2 the pressure will increase from P1 to P2 with a constant volume, as described by Equation (3).

In step 200b, when the pressure within the fluid becomes larger than Pe (at T2), the volume starts to increase while the pressure remains constant, as described by Equation (2).

In step 200c, after approaching the maximum temperature available (T3), the system temperature is reduced. At this stage the fluid pressure starts to decrease at constant volume if the weight replaced on the piston is fixed in position.

In step 200d, when the fluid pressure becomes less than the initial pressure Pe, the fluid volume will contract, moving the piston downward until it reaches its initial volume (V1) at the initial temperature (T1).

Based on the FEE cycle 100, a prototype system has been developed and tested. The environmental setup 300 presented in FIG. 3 shows the different components of the system, which includes cylinders 10a and 10b and a set of valves 80a and 80b. A gear box 90 with a 1:16 ratio is attached to the fluid motor 50. A thermal readout box 40c is connected to the thermometers 40a and 40b. Interconnection of the components was detailed in the discussion of the system diagram of FIG. 4 supra.

The system is operated by raising the temperature of the working fluid in one of the cylinders while reducing the temperature of the working fluid in the other cylinder. This can be done by pumping hot water to the heat exchanger coil in one of the cylinders while pumping cold water to the heat exchanger coil in the other cylinder.

In comparing operation of the system to the FEE cycle, it should be understood that in a first stage, as the temperature rises in cylinder 10a, pressure builds up, generating a force that pushes the fluid through the fluid motor 50. At the same time, reducing the temperature in the cylinder 10b generates negative pressure, which pulls the working fluid from the fluid motor 50 (step 1 in the FEE cycle). In a second stage, when the combined pushing and pulling forces of cylinder 10a and 10b exceed the friction force of the fluid motor 50, the fluid flow causes the fluid motor 50 to rotate (step 2 in the FEE cycle). Each cubic centimeter of liquid passing through the fluid motor 50 generates one revolution of the fluid motor's shaft. In a third stage, when the temperature of the working fluid reaches the temperature of the reservoir, the process will be reversed. At this stage the pressure in cylinder 10a reduces from a positive value to a negative value as the temperature decreases, and the opposite occurs in cylinder 10b (step 200c in the FEE cycle). In a fourth stage, when the combined pulling and pushing forces generated by cylinders 10a and 10b exceed the friction forces of the motor, the fluid passes from cylinder 10b to cylinder 10a, causing the fluid motor 50 to rotate in the opposite direction, as occurred in step 2 (step 200d in the FEE cycle).

The system efficiency can vary significantly based on such factors as physical properties of the working liquid fluid (including an expansion coefficient that determines how much movement the system generates for each degree centigrade increase in temperature), a bulk modulus that determines how much force the system generates for each degree centigrade increase in temperature, and heat capacity, which determines how much energy is required to raise the temperature of the fluid one degree centigrade.

Physical properties of the cylinders housing the working fluids also have an effect on the system efficiency. The cylinder will expand as the working fluid expands, since its temperature will increase in the same rate. Therefore, the volumetric expansion of the cylinder has to be subtracted from the volumetric expansion of the fluid in order to get the system net expansion.

Moreover, the heat exchanger system has an effect on system efficiency. The system power will depend on how fast the energy is transferred to the working fluid (to increase its temperature) and how fast it can be drawn out of the system to cool down the working fluid.

The system efficiency ($\eta$) can be defined as the ratio between the work done by the system ($W_{out}$) to the energy put into the system ($Q_{in}$):

$$\eta = W_{out}/Q_{in}. \qquad (5)$$

The work done by the system is the force on the system (FIG. 2) multiplied by the distance (L) or the displacement of the piston:

$$W_{out} = L \times F. \qquad (6)$$

The force is simply the mass placed on the piston (in Kilograms) multiplied by the gravitational acceleration (g=9.8 m/s):

$$F = m \times g. \qquad (7)$$

The displacement L can be obtained by dividing the volumetric expansion ($\Delta V$) by the piston area (A), in case of the example in FIG. 2, or the cylinder outlet area connected to the hydraulic tube, in the prototype system:

$$L = \Delta V/A. \qquad (8)$$

The energy put into the system to perform the required work can be calculated in four stages. In stage one, the temperature increases from T1 to T2, while the pressure increases at constant volume (FIG. 2). At T2 the pressure produces a force equal to or greater than the force working on the system. The force of the working fluid can be calculated as follows:

$$F = P \times A. \qquad (9)$$

The heat energy required for stage 1 can be calculated as follows:

$$E1 = C \times \rho \times V \times \Delta T1 \qquad (10)$$

where C is the heat capacity of the working fluid (Eq. 3), $\rho$ is density of the working fluid, V is volume of working fluid, and $\Delta T1 = T2 - T1$.

In stage two the temperature increases from T2 to T3. The working fluid expands at constant pressure. The energy (E2) required at this stage can be calculated as follows:

$$E2 = C \times \rho \times V \times \Delta T2, \qquad (11)$$

In this stage, the pressure of the working fluid will be reduced as the temperature drops from T3 to T4 ($\Delta T3$) at constant volume. Equations 8, 9 and 10 can be used to calculate the energy (E3). It should be understood that the energy taken out of the system (E3) is ideally equal to the energy put into the system (E1).

Similarly, in stage 4, the temperature of the working fluid drops from T4 to T1 ($\Delta T4$), giving up energy equal to the input energy calculated in stage 1.

The theoretical system produces work with zero energy loss, but in the practical system, as constrained by the first law of thermodynamics, only a limited amount of energy can be recovered from the system in stages 3 and 4. This can be easily determined experimentally by measuring the temperature of the heat exchange fluid supplied to the cylinders. If it is assumed that none of the input energy is recovered from the system, then the efficiency can be calculated using the following equation:

$$\eta = W_{out}/Q_{in} = \frac{L \times F}{C \times m \times (\Delta T1 + \Delta T2)} \qquad (12)$$

From Equations (1) and (2), the force (F) is:

$$F = K \times \alpha_f \times \Delta T1 \times A \qquad (13)$$

$$\alpha_f = \alpha_v - \alpha_c, \qquad (14)$$

where $\alpha_V$ is the working fluid volumetric thermal expansion coefficient, $\alpha_c$ is the cylinder's volumetric thermal expansion coefficient, and $\alpha_f$ is net volumetric thermal expansion coefficient of the working fluid.

From Equations (1), the displacement (L), which occurs at constant pressure in stage two of the cycle, during the increase of temperature from T2 to T3, can be derived as follows:

$$L = \frac{\alpha_f \times V \times \Delta T2}{A}. \qquad (15)$$

From Equations (13), (14) and (15), and taking into consideration that the system will generate work during the extraction (stage 4) equal to the work generated during stage 2 of the cycle, the efficiency equation can be rewritten as follows:

$$\eta = W_{out}/Q_{in} = \frac{2 \times K \times \alpha_f^2 \times \Delta T1 \times \Delta T2}{C \times \rho \times (\Delta T1 + \Delta T2)}. \qquad (16)$$

The system efficiency depends on how much heat energy can be recovered from the system for recirculation. If all the input heat energy is recovered, then the efficiency could reach 100%. However, this is impossible. On the other hand, if none of the heat energy is recovered, the efficiency can be calculated using Equation (16). The efficiency is a function of the physical properties of working fluids, in this case, glycerin and mercury (presented in Table 1), along with the temperature differential ($\Delta T$) and system specification. Table 2 presents the efficiencies of glycerin and mercury for different $\Delta T$. Glycerin provided slightly higher efficiency. For glycerin, the efficiency varies from 0.043 (4.3%) at 100° C. to 0.21 (21%) at 1500° C. By recovering some of the heat energy drown from the system during stages 2 and 3, and by applying high $\Delta T$, the efficiency could be comparable to the internal combustion engine, which reaches 30%. The working liquid in the cylinders should be air-free. Any air that leaks to the cylinders will lead to a significant reduction in the system efficiency. The other factor that impacts the system efficiency is the force acting on the system (F). This should be predetermined using Equations (13) and (14) so that $\Delta T1 = \Delta T2$.

TABLE 1

Working Fluid and System Parameters

| | Glycerin | Mercury | Stainless Steel |
|---|---|---|---|
| $\rho$ (Kg/m$^3$) | 1261 | 1353.4 | — |
| C (j/Kg · K) | 2430 | 139.5 | — |
| K (pa) | 4.35E+09 | 2.85E+10 | — |

TABLE 1-continued

Working Fluid and System Parameters

|  | Glycerin | Mercury | Stainless Steel |
|---|---|---|---|
| $\alpha_V(K^{-1})$ | 5.0E−4 | 18.2E−5 | 5.19E−5 |
| V (m³L) | 290.0029 | 290.0029 | — |

TABLE 2

System efficiencies for different ΔT

| ΔT | Glycerin | Mercury |
|---|---|---|
| 100 | 0.014252 | 0.012759 |
| 200 | 0.028505 | 0.025518 |
| 300 | 0.042757 | 0.038277 |
| 400 | 0.05701 | 0.051036 |
| 1000 | 0.142524 | 0.12759 |
| 1500 | 0.213786 | 0.191385 |

It is to be understood that the present invention is not limited to the embodiments described above, but encompasses any and all embodiments within the scope of the following claims.

I claim:

1. A fluid expansion engine, comprising:
a first primary pressurized vessel having a first end, a second end, a first heat exchanger inlet on the first end, and a first heat exchanger outlet on the second end of the first primary pressurized vessel;
a second primary pressurized vessel having a first end, a second end, a second heat exchanger inlet on the first end and a second heat exchanger outlet on the second end of the second primary pressurized vessel;
a conduit system connecting the first and second primary pressurized vessels;
a working fluid disposed in the first and second primary pressurized vessels and in the conduit system, the working fluid being a liquid, the first and second primary pressurized vessels and the conduit system being air-free and gas-free;
a first heat exchanger coil extending between the first heat exchanger inlet and the first heat exchanger outlet inside the first primary pressurized vessel for cyclically heating and cooling the liquid contained in the first primary pressurized vessel;
a second heat exchanger extending between the second heat exchanger inlet and the second heat exchanger outlet inside the second primary pressurized vessel for cyclically heating and cooling the liquid contained in the second primary pressurized vessel;
a first four-way valve connected between the heat exchanger inlets of the first primary pressurized vessel and the second primary pressurized vessel;
a second four-way valve connected between the heat exchanger outlets of the first primary pressurized vessel and the second primary pressurized vessel;
means for actuating the first and second four-way valves, wherein the liquid contained by the first and second primary pressurized vessels is reciprocally heated and cooled without changing phase; and
means for extracting work done by the first and second primary pressurized vessels during the reciprocal heating and cooling of the liquid contained therein.

2. The fluid expansion engine according to claim 1, further comprising:
a first pressure gauge connected to the first primary pressurized vessel for reading internal pressure of the first primary pressurized vessel; and
a second pressure gauge connected to the second primary pressurized vessel for reading internal pressure of the second primary pressurized vessel.

3. The fluid expansion engine according to claim 1, further comprising:
a first thermometer connected to the first primary pressurized vessel for reading the temperature of the liquid contained in the first primary pressurized vessel; and
a second thermometer connected to the second primary pressurized vessel for reading the temperature of the liquid contained in the second primary pressurized vessel.

4. A fluid expansion engine, comprising:
a first primary pressurized vessel having a first end, a second end, a first heat exchanger inlet on the first end, and a first heat exchanger outlet on the second end of the first primary pressurized vessel;
a second primary pressurized vessel having a first end, a second end, a second heat exchanger inlet on the first end and a second heat exchanger outlet on the second end of the second primary pressurized vessel;
a conduit system connecting the first and second primary pressurized vessels;
a working fluid disposed in the first and second primary pressurized vessels and in the conduit system, the working fluid being a liquid, the first and second primary pressurized vessels and the conduit system being air-free and gas-free;
a first heat exchanger coil extending between the first heat exchanger inlet and the first heat exchanger outlet inside the first primary pressurized vessel for cyclically heating and cooling the liquid contained in the first primary pressurized vessel;
a second heat exchanger extending between the second heat exchanger inlet and the second heat exchanger outlet inside the second primary pressurized vessel for cyclically heating and cooling the liquid contained in the second primary pressurized vessel;
a first four-way valve connected between the heat exchanger inlets of the first primary pressurized vessel and the second primary pressurized vessel;
a second four-way valve connected between the heat exchanger outlets of the first primary pressurized vessel and the second primary pressurized vessel;
a hot reservoir;
a first pump disposed in the hot reservoir and having an output connected to the first four-way valve;
a cold reservoir;
a second pump disposed in the cold reservoir and having an output connected to the first four-way valve;
a conduit connecting the hot reservoir to the second four-way valve;
a conduit connecting the cold reservoir to the second four-way valve;
wherein hot heat exchange fluid from the hot reservoir and cold heat exchange fluid from the cold reservoir are alternately cycled through the first and second primary pressurized vessels, thereby reciprocally heating and cooling the liquid contained by them without changing phase;
a first secondary pressurized vessel connected to the first primary pressurized vessel, the first secondary pressurized vessel being filled with a combination of hydraulic fluid and the working fluid;

a second secondary pressurized vessel connected to the second primary pressurized vessel, the second secondary pressurized vessel being filled with a combination of hydraulic fluid and the working fluid;
a fluid motor;
a gearbox connected to the fluid motor;
a first conduit in the conduit system connecting the first secondary pressurized vessel to the fluid motor; and
a second conduit in the conduit system connecting the second secondary pressurized vessel to the fluid motor;
wherein reciprocal expansion and contraction of the working fluid contained by the first and second primary pressurized vessels causes the fluid motor to power the gearbox, thereby extracting work done within the first and second primary pressurized vessels.

5. The fluid expansion engine according to claim 4, further comprising:
a first pressure gauge connected to the first primary pressurized vessel for reading internal pressure of the first primary pressurized vessel; and
a second pressure gauge connected to the second primary pressurized vessel for reading internal pressure of the second primary pressurized vessel.

6. The fluid expansion engine according to claim 4, further comprising:
a first thermometer connected to the first primary pressurized vessel for measuring the temperature of the liquid in the first primary pressurized vessel; and
a second thermometer connected to the second primary pressurized vessel for measuring the temperature of the liquid in the second primary pressurized vessel.

\* \* \* \* \*